(12) United States Patent
Larsen

(10) Patent No.: US 6,682,281 B1
(45) Date of Patent: Jan. 27, 2004

(54) LOCKING FASTENER APPARATUS

(76) Inventor: Lawrence E. Larsen, P.O. Box 82, Eden, VT (US) 05652

(*) Notice: Subject to any disclaimer, the term of this patent is extended or adjusted under 35 U.S.C. 154(b) by 0 days.

(21) Appl. No.: 10/195,076

(22) Filed: Jul. 12, 2002

(51) Int. Cl.[7] .............................................. F16B 39/32
(52) U.S. Cl. ...................... 411/327; 411/115; 411/294; 411/329
(58) Field of Search ................................ 411/114, 115, 411/292, 294, 300, 321, 322, 326, 327, 329

(56) References Cited

U.S. PATENT DOCUMENTS

| | | | |
|---|---|---|---|
| 969,434 A | * | 9/1910 | Wilt ............................. 411/115 |
| 1,099,005 A | * | 6/1914 | Young ........................... 411/294 |
| 1,155,233 A | * | 9/1915 | Hammond ................... 411/327 |
| 1,183,966 A | | 5/1916 | Flake |
| 1,195,468 A | | 8/1916 | Hervert |
| 1,238,012 A | * | 8/1917 | Hall ............................. 411/115 |
| 1,246,631 A | * | 11/1917 | Macy ........................... 411/115 |
| 1,252,088 A | | 1/1918 | Chism |
| 1,640,374 A | | 8/1927 | Russell |
| 1,703,947 A | * | 3/1929 | Nation ......................... 411/329 |
| 1,743,262 A | | 1/1930 | Bishop |
| 2,672,358 A | * | 3/1954 | Wienola ................... 411/948 X |
| D416,787 S | | 11/1999 | Mensour et al. |

* cited by examiner

Primary Examiner—Neill Wilson

(57) ABSTRACT

A locking fastener apparatus for coupling objects together. The locking fastener apparatus includes a bolt having a head portion and a shaft portion with a plurality of shaft slots along the shaft. A nut has a threaded hole for threadably receiving the shaft portion of the bolt. A nut slot is centrally positioned across a width of a first side portion of the nut. The nut has a nut lock bore extending inwardly through the nut slot from the first side portion towards a central hole of the nut. The nut includes a nut lock member for movably positioning in the nut lock bore of the nut. The inner end of the nut lock member has a catch portion that is engagable with the shaft slots. A lever member pivotally coupled to the nut is positioned in the nut slot, with a first end attached to the nut lock member and a second end abutting a biasing member which biases the catch portion into one of the shaft slots to facilitate locking the two together until.

15 Claims, 2 Drawing Sheets

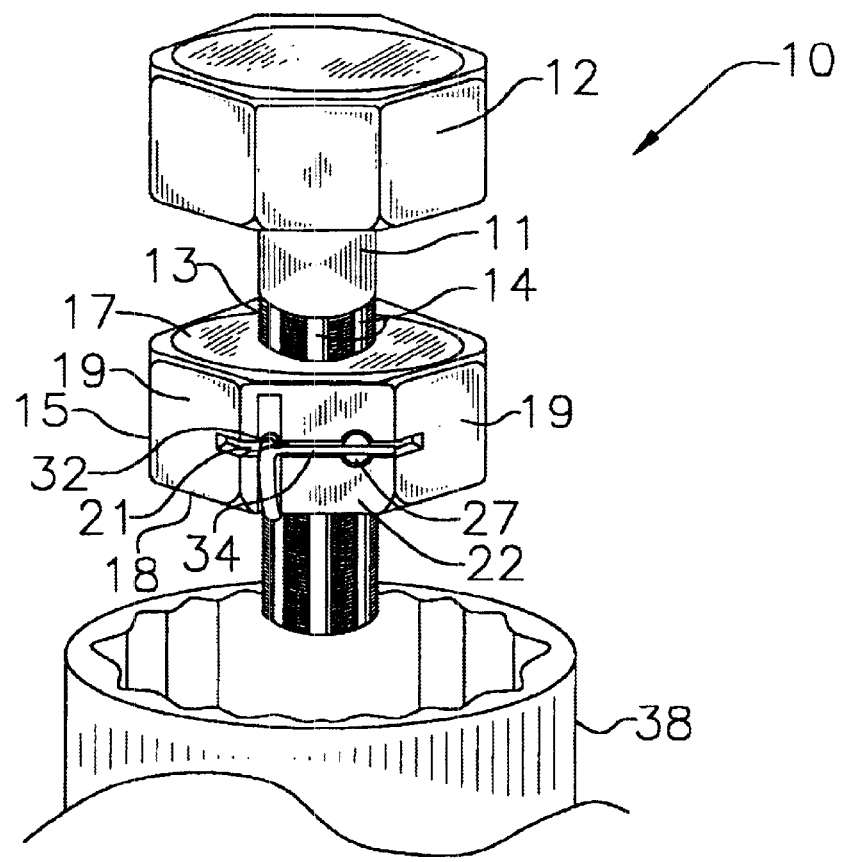
FIG. 1
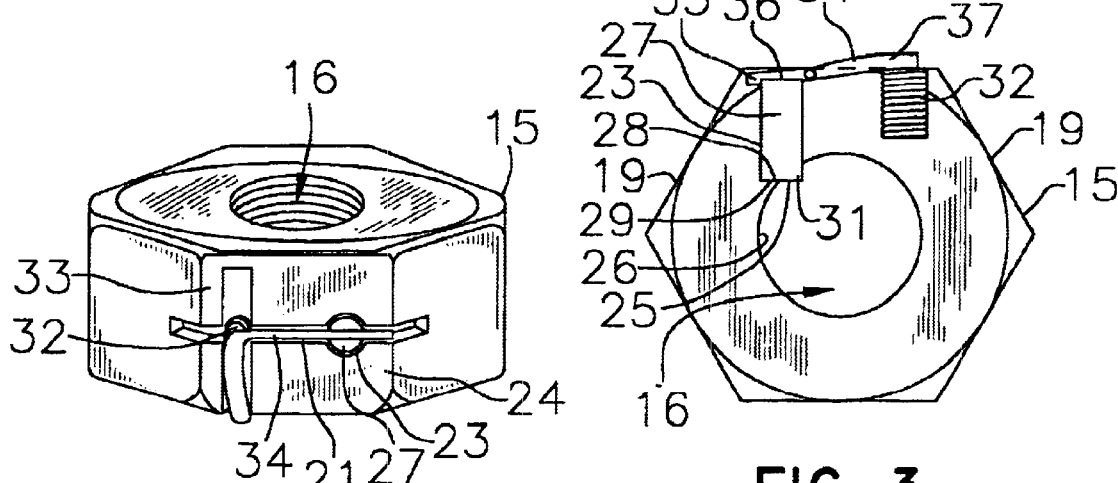
FIG. 2
FIG. 3

LOCKING FASTENER APPARATUS

BACKGROUND OF THE INVENTION

1. Field of the Invention

The present invention relates to fasteners and more particularly pertains to a new locking fastener apparatus for coupling objects together.

2. Description of the Prior Art

The use of fasteners is known in the prior art. U.S. Pat. No. 1,195,468 describes a nut lock. Another type of fastener is U.S. Pat. No. 1,183,966 comprising a nut having a spring-actuated latching mechanism for gripping onto the threads of a bolt.

While these devices fulfill their respective, particular objectives and requirements, the need remains for a system that incorporates a more positive locking mechanism.

SUMMARY OF THE INVENTION

The present invention meets the needs presented above by combining a latching mechanism on a nut that engages slots in a correlating bolt.

Still yet another object of the present invention is to provide a new locking fastener apparatus that incorporates a design that more positively ensures that coupled objects will not loosen or separate during use.

Even still another object of the present invention is to provide a new locking fastener apparatus that is unyielding to vibration that often loosens nuts and bolts.

To this end, the present invention generally comprises a bolt having a head portion and a shaft portion with a plurality of shaft slots along the shaft. A nut has a threaded hole for threadably receiving the shaft portion of the bolt. A nut slot is centrally positioned across a width of a first side portion of the nut. The nut has a nut lock bore extending inwardly through the nut slot from the first side portion towards a central hole of the nut. The nut includes a nut lock member for movably positioning in the nut lock bore of the nut. The inner end of the nut lock member has a catch portion that is engagable with the shaft slots. A lever member pivotally coupled to the nut is positioned in the nut slot, with a first end attached to the nut lock member and a second end abutting a biasing member which biases the catch portion into one of the shaft slots to facilitate locking the two together until.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new locking fastener apparatus according to the present invention.

FIG. 2 is a schematic perspective view of the nut of the present invention.

FIG. 3 is a schematic top cut-away view of the nut of the present invention.

DESCRIPTION OF THE PREFERRED EMBODIMENT

Figure 4:
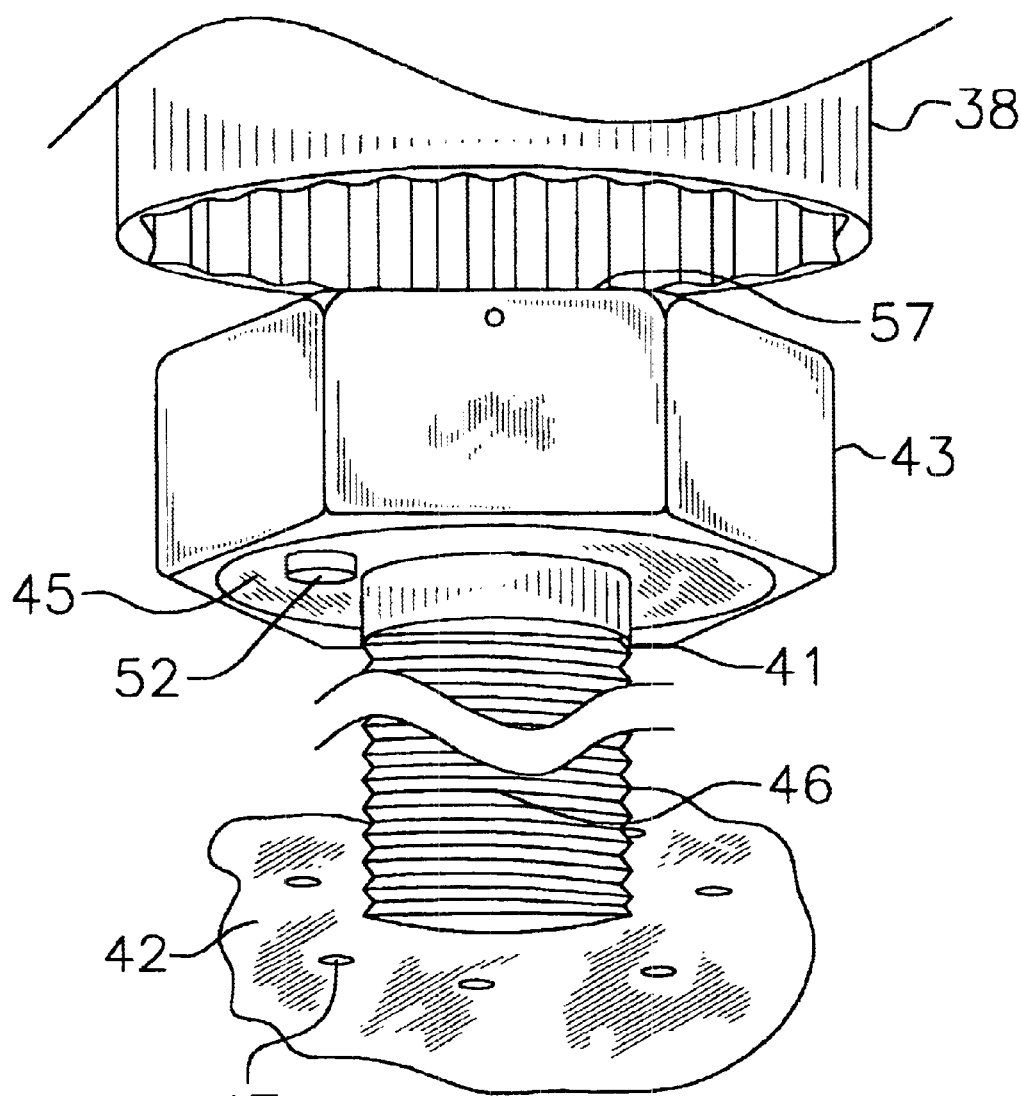
FIG. 4 is a schematic bottom perspective view of the alternate embodiment of the present invention.
Figure 5:
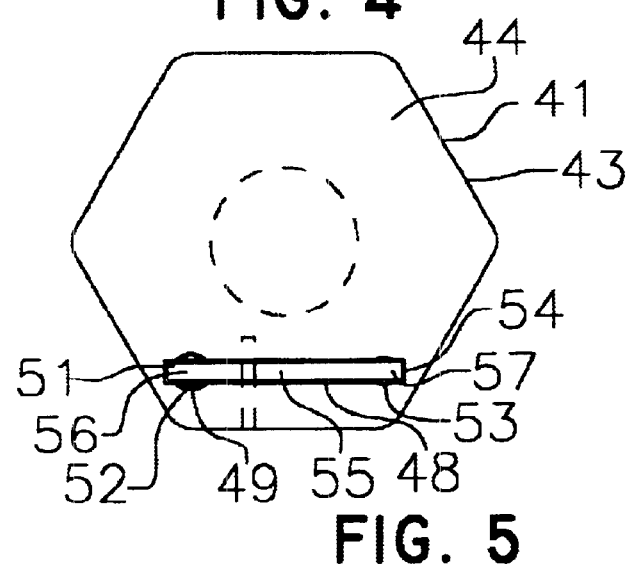
FIG. 5 is a schematic top view of the alternate embodiment of the present invention.

With reference now to the drawings, and in particular to FIGS. 1 through 5 thereof, a new locking fastener apparatus embodying the principles and concepts of the present invention and generally designated by the reference numeral 10 will be described.

As best illustrated in FIGS. 1 through 5, the locking fastener apparatus 10 generally comprises a bolt 11 that has a head portion 12 and a threaded shaft portion 13. The shaft portion 13 has a plurality of shaft slots 14.

A nut 15 has a threaded hole 16 for threadably receiving the shaft portion 13 of the bolt 11. The nut 15 is releasably engagable with the shaft portion 13 of the bolt 11. The nut 15 has an upper side 17, a lower side 18, and a plurality of side portions 19.

The nut 15 is restricted from rotating about the shaft portion 13 of the bolt 11 when engaged with one of the slots of the bolt 11 for the purpose of restricting objects fastened together by the bolt 11 and the nut 15 from separating.

Each of the shaft slots 14 of the bolt 11 is spaced about a circumference of the shaft portion 13 and is oriented substantially parallel to a longitudinal axis of the shaft portion 13 and extends generally a full length of the shaft portion 13.

The nut 15 has a nut slot 21 disposed in a first side portion 22 of the plurality of side portions 19. The nut slot 21 is centrally positioned across a width of the first side portion 22 and is oriented substantially parallel to the upper and lower side 18 of the nut 15.

The nut 15 has a nut lock bore 23 extending inwardly through the nut slot 21 from the first side portion 22 towards the hole 16 of the nut 15. The nut lock bore 23 is positioned generally adjacent to a first outer edge 24 of the first side portion 22 of the nut 15 and is oriented substantially perpendicular to the hole 16.

The nut lock bore 23 of the nut 15 extends into the first side portion 22 such that an aperture 25 is formed in an outer wall 26 of the nut 15 that defines the hole 16.

The nut 15 includes a nut lock member 27 for movably positioning in the nut lock bore 23 of the nut 15. The nut lock member 27 has an angled inner end 28 for abutting an inside end 29 of the nut lock bore 23 when fully received by the nut lock bore 23.

The inner end 28 of the nut lock member 27 has a catch portion 31 for extending into the aperture 25 of the nut 15 such that the catch portion 31 is engagable with the shaft slots 14 when the nut 15 is threadably positioned on the bolt 11 and the nut lock member 27 is fully received by the nut lock bore 23 of the nut 15.

The nut 15 has a biasing member 32 that is disposed in a second outer edge of the first side portion 22 of the nut 15 and is centrally positioned in the nut slot 21.

The nut 15 includes a lever member 34 pivotally coupled to the first side portion 22 of the nut 15 and extends a length of the first side portion 22.

A first end 35 of the lever member 34 is attached to an outer end 36 of the nut lock member 27 and is positioned in the nut slot 21 of the nut 15.

A second end 37 of the lever member 34 extends outward from the nut slot 21 of the nut 15 and is positioned atop the biasing member 32.

The biasing member 32 biases the second end 37 of the lever member 34 outward from the first side portion 22 causing the nut lock member 27 to move inward fully through the nut lock bore 23 of the nut 15.

The catch portion 31 of the nut lock member 27 engages one of the shaft slots 14 when the nut 15 is threadably coupled to the bolt 11 and the nut lock member 27 is aligned with one of the shaft slots 14.

The catch portion 31 of the nut lock member 27 is moved out of the shaft slot when the second end 37 of the lever member 34 is biased inward by the attachment of a conventional fastener tool 38 to the nut 15.

An alternate embodiment of the present invention comprises a bolt 41 for threadably coupling to an object 42. The bolt 41 includes a head 43 that has a top side 44 and a bottom side 45, and includes a threaded shaft 46.

The bolt 41 has a locking assembly for selectively engaging a plurality of locking holes 47 in the object 42 being coupled to.

The locking assembly includes a bolt slot 48 that is disposed in the top side 44 of the head 43 of the bolt 41 and is positioned offset from a center of the head 43.

The locking assembly includes a bolt lock bore 49 extending through the head 43. The bolt lock bore 49 is centrally located on a first end 51 of the bolt slot 48 and is oriented substantially perpendicular to the top and bottom side 45 of the head 43.

The locking assembly includes a bolt lock member 52 for movably positioning in the bolt lock bore 49 of the bolt 41. The bolt lock member 52 extends generally below the bottom side 45 of the head 43 of the bolt 41 when fully received by the bolt lock bore 49 such that the bolt lock member 52 is engagable with one of the locking holes 47 in the object 42 the bolt 41 is being fastened to.

The locking assembly includes a biasing member 53 that is disposed in the top side 44 of the head 43 of the bolt 41. The biasing member 53 is centrally positioned in a second end 54 of the bolt slot 48.

The locking assembly includes a lever member 55 pivotally coupled to the head 43 of the bolt 41 and extends a length of the bolt slot 48. A first outer end 56 of the lever member 55 is attached to the bolt lock member 52 and is positioned in the bolt slot 48 generally adjacent to the top side 44 of the head 43 of the bolt 41. A second outer end 57 of the lever member 55 extends outward from the bolt slot 48 of the bolt 41 and is positioned atop the biasing member 53.

The biasing member 53 biases the second outer end 57 of the lever member 55 outward from the top side 44 of the head 43 of the bolt 41 causing the bolt lock member 52 to move through the bolt lock bore 49 and outward from the bottom side 45 to engage one of the locking holes 16 in the object 42.

The bolt lock member 52 is moved out of the locking hole 16 in the object 42 engaged with when the second outer end 57 of the lever member 55 is biased inward towards the bottom side 45 of the head 43 of the bolt 41. The attachment of a conventional fastener tool 38 depresses the second outer end 57 of the lever member 55 inward, disengaging the bolt lock member 52 from the locking hole 16 in the object 42.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A locking fastener apparatus for coupling objects together, said apparatus comprising:

a bolt having a head portion and a threaded shaft portion, said shaft portion having a plurality of shaft slots;

a nut having a threaded hole for threadably receiving said shaft portion of said bolt, said nut being releasably engagable with said shaft portion of said bolt, said nut having an upper side, a lower side, and a plurality of side portions; and said nut having a nut slot disposed in a first side portion of said plurality of side portions, said nut slot being centrally positioned across a width of said first side portion and being oriented substantially parallel to said upper and lower sides of said nut;

said nut having a nut lock bore extending inwardly through said nut slot from said first side portion towards said hole of said nut, said nut lock bore being positioned generally adjacent to a first outer edge of said first side portion of said nut and being oriented substantially perpendicular to said hole; and wherein said nut lock bore of said nut extends into said first side portion such that an aperture is formed in an outer wall of said nut to define said hole;

said nut including a nut lock member for movably positioning in said nut lock bore of said nut, said nut lock member having an angled inner end for abutting an inside end of said nut lock bore when fully received by said nut lock bore; and said inner end of said nut lock member having a catch portion for extending into said aperture of said nut such that said catch portion is engagable with said shaft slots when said nut is threadably positioned on said bolt and said nut lock member is fully received by said nut lock bore of said nut.

2. The locking fastener apparatus as set forth in claim 1, further comprising each of said shaft slots of said bolt being spaced about a circumference of said shaft portion, each of said shaft slots being oriented substantially parallel to a longitudinal axis of said shaft portion and extending generally a full length of said shaft portion.

3. The locking fastener apparatus as set forth in claim 1, further comprising said nut having a biasing member being disposed in a second outer edge of said first side portion of said nut and being centrally positioned in said nut slot.

4. The locking fastener apparatus as set forth in claim 3, further comprising said nut including a lever member being pivotally coupled to said first side portion of said nut and extending a length of said first side portion;

a first end of said lever member being attached to an outer end of said nut lock member and being positioned in said nut slot of said nut; and a second end of said lever member extending outwardly from said nut slot of said nut and being positioned atop said biasing member.

5. The locking fastener apparatus as set forth in claim 4, wherein said biasing member biases said second end of said lever member outward from said first side portion causing said nut lock member to move inward fully through said nut lock bore of said nut.

6. The locking fastener apparatus as set forth in claim 3, wherein said catch portion of said nut lock member engages one of said shaft slots when said nut is threadably coupled to said bolt and said nut lock member is aligned with one of said shaft slots.

7. The locking fastener apparatus as set forth in claim 4, wherein said catch portion of said nut lock member is moved out of said shaft slot when said second end of said lever member is biased inward by the attachment of a conventional fastener tool to said nut.

8. A locking fastener apparatus for coupling objects together, said apparatus comprising:

a bolt having a head portion and a threaded shaft portion, said shaft portion having a plurality of shaft slots;

a nut having a threaded hole for threadably receiving said shaft portion of said bolt, said nut being releasably engagable with said shaft portion of said bolt, said nut having an upper side, a lower side, and a plurality of side portions;

each of said shaft slots of said shaft portion of said bolt being spaced about a circumference of said shaft portion, each of said shaft slots being oriented substantially parallel to a longitudinal axis of said shaft portion and extending generally a full length of said shaft portion;

said nut having a nut slot disposed in a first side portion of said plurality of side portions, said nut slot being centrally positioned across a width of said first side portion and being oriented substantially parallel to said upper and lower sides of said nut, said nut having a nut lock bore extending inwardly through said nut slot from said first side portion towards said hole of said nut, said nut lock bore being positioned generally adjacent to a first outer edge of said first side portion of said nut and being oriented substantially perpendicular to said hole;

wherein said nut lock bore of said nut extends into said first side portion such that an aperture is formed in an outer wall of said nut defining said hole;

said nut including a nut lock member for movably positioning in said nut lock bore of said nut, said nut lock member having an angled inner end for abutting an inside end of said nut lock bore when fully received by said nut lock bore, said inner end of said nut lock member having a catch portion for extending into said aperture of said nut such that said catch portion is engagable with said shaft slots when said nut is threadably positioned on said bolt and said nut lock member is fully received by said nut lock bore of said nut;

said nut having a biasing member being disposed in a second outer edge of said first side portion of said nut and being centrally positioned in said nut slot;

said nut including a lever member being pivotally coupled to said first side portion of said nut and extending a length of said first side portion, a first end of said lever member being attached to an outer end of said nut lock member and being positioned in said nut slot of said nut, a second end of said lever member extending outwardly from said nut slot of said nut and being positioned atop said biasing member;

wherein said biasing member biases said second end of said lever member outward from said first side portion causing said nut lock member to move inward fully through said nut lock bore of said nut;

wherein said catch portion of said nut lock member engages one of said shaft slots when said nut is threadably coupled to said bolt and said nut lock member is aligned with one of said shaft slots;

wherein said catch portion of said nut lock member is moved out of said shaft slot when said second end of said lever member is biased inward by the attachment of a conventional fastener tool to said nut.

9. A locking fastener apparatus for coupling objects together, said apparatus comprising:

a bolt for threadably coupling to an object, said bolt comprising a head having a top side and a bottom side, and including a threaded shaft; and said bolt having a locking assembly for selectively engaging a plurality of locking holes in the object being coupled to;

said locking assembly including a bolt slot being disposed in said top side of said head of said bolt and being positioned offset from a center of said head.

10. The locking fastener apparatus as set forth in claim 9, further comprising said locking assembly including a bolt lock bore extending through said head, said bolt lock bore being centrally located on a first end of said bolt slot and being oriented substantially perpendicular to said top and bottom sides of said head.

11. The locking fastener apparatus as set forth in claim 10, further comprising said locking assembly including a bolt lock member for movably positioning in said bolt lock bore of said bolt, said bolt lock member extending generally below said bottom side of said head of said bolt when fully received by said bolt lock bore such that said bolt lock member is engagable with one of the locking holes in the object said bolt is being fastened to.

12. The locking fastener apparatus as set forth in claim 11, further comprising said locking assembly including a biasing member being disposed in said top side of said head of said bolt, said biasing member being centrally positioned in a second end of said bolt slot.

13. The locking fastener apparatus as set forth in claim 12, further comprising said locking assembly including a lever member being pivotally coupled to said head of said bolt and extending a length of said bolt slot, a first outer end of said lever member being attached to said bolt lock member and being positioned in said bolt slot generally adjacent to said top side of said head of said bolt, a second outer end of said lever member extending outwardly from said bolt slot of said bolt and being positioned atop said biasing member.

14. The locking fastener apparatus as set forth in claim 13, wherein said biasing member biases said second outer end of said lever member outward from said top side of said head of said bolt causing said bolt lock member to move through said bolt lock bore and outward from said bottom side to engage one of the locking holes in the object.

15. The locking fastener apparatus as set forth in claim 14, wherein said bolt lock member is moved out of the locking hole in the object engaged with when said second outer end of said lever member is biased inward towards said bottom side of said head of said bolt, wherein the attachment of a conventional socket fastening tool depresses said second outer end of said lever member inward disengaging said bolt lock member from the locking hole in the object.

* * * * *